(12) United States Patent
Moermans (10) Patent No.: US 8,761,762 B2
(45) Date of Patent: Jun. 24, 2014

(54) MIGRATION AND ACTIVATION OF SERVICES IN A NETWORK

(75) Inventor: Willem Jacques Alexander Moermans, The Hague (NL)

(73) Assignee: Koninklijke KPN N.V., The Hague (NL)

( * ) Notice: Subject to any disclaimer, the term of this patent is extended or adjusted under 35 U.S.C. 154(b) by 93 days.

(21) Appl. No.: 13/477,189

(22) Filed: May 22, 2012

(65) Prior Publication Data

US 2012/0302233 A1 Nov. 29, 2012

(30) Foreign Application Priority Data

May 27, 2011 (EP) ..................................... 11167982

(51) Int. Cl.
*H04W 4/00* (2009.01)
(52) U.S. Cl.
USPC ........................................ 455/432.3; 709/223
(58) Field of Classification Search
USPC ........................................ 455/432.3; 709/223
See application file for complete search history.

(56) References Cited

U.S. PATENT DOCUMENTS

| | | |
|---|---|---|
| 7,620,034 B1 | 11/2009 | Tran et al. |
| 2008/0162637 A1 | 7/2008 | Adamczyk et al. |

OTHER PUBLICATIONS

Chiou, Hong-Bin et al., IP Multimedia Subsystem, Experience with an IP Multimedia System Trial for PSTN Migration, IEEE Communications Magazine, Jul. 2007, pp. 127-133.

3rd Generation Partnership Project (3GPP)—3rd generation partnership project, technical specification group services and system aspects, IP multimedia subsystem (IMS), stage 2 (release 10), vol. 10.3.1, Jan. 2011, pp. 1-274.

European Patent Office, European Search Report and Annex to the European Search Report on European Patent Application No. EP 11 16 7982, report date Oct. 31, 2011, pp. 1-12.

*Primary Examiner* — Charles Shedrick
(74) *Attorney, Agent, or Firm* — McDonnell Boehnen Hulbert & Berghoff LLP (57) ABSTRACT

Methods and system for migrating or activating a service in a network are described. The method for migrating comprises: creating an extended user profile associated with said at least one client in a user profile database, preferably a HSS, said extended user profile comprising migration server routing information; registering said at least one user equipment with a migration application server on the basis of said migration server routing information; executing a migration service hosted on a migration application server for migrating at least one service from said donating network to said receiving network; and, updating said extended user profile by removing said migration server routing information from said extended user profile.

20 Claims, 5 Drawing Sheets

MIGRATION AND ACTIVATION OF SERVICES IN A NETWORK

PRIORITY

This application claims priority to European Patent Application No. EP 11167982.5, filed on May 27, 2011. European Patent Application No. EP 11167982.5 is hereby incorporated by reference.

FIELD OF THE INVENTION

The invention generally relates to migration and/or activation of services in a network and, in particular, though not necessarily, to methods and systems for migration of services to a next generation network and/or for activation of services in a next generation network, preferably an IMS-type next generation network, a migration and activation server for use in such systems and a software program product using such methods.

BACKGROUND OF THE INVENTION

Introduction of and desire for IP-based communications systems and services motivate telecommunication operators to migrate customers (subscribers) and services from a conventional telecommunications network (a donating network), e.g. circuit switched and/or soft switch based network to a new IMS-based next generation network (NGN) (the receiving network). Such IMS-based NGNs include communications networks based on the 3GGP IMS architecture which provides an all-IP platform for delivery of video, voice and multimedia services.

IMS-based NGNs are generally characterized by a control layer comprising serving network node(s) for handling session control, an application layer associated with application servers for executing services and a transport layer associated with a multi-service IP network for handling the underlying data transport.

A further need for service migration stems from consolidation between existing IMS-based NGN networks wherein service migration from an IMS-based donating network to a new IMS-based receiving network is required. Meanwhile, services associated with new (non-migrating) subscribers to the new (receiving) IMS-based network may require service activation which support number portability and other related portability services. Such may be the case when an operator operating an IMS-based receiving network accepts a new subscriber, which used to be subscribed to for instance an IMS-based, or otherwise SIP-based network operated by another competing operator, wherein the subscriber wishes to retain its number.

In order to migrate a service from a donating to a receiving network, at least the receiving network needs to be reconfigured such that it is able to deliver the requested one or more services to the (migrated) subscriber via its platform. Consequently, in a migration scenario, the delivery of the original service to the (migrated) subscriber by the donating network is disabled and the new service in the receiving network is activated. In order to keep the Quality of Services high, it is a desire of operators of receiving networks that such a migration should be without or almost without service interruptions. This is further stimulated by governmental regulations requiring minimal service interruption during the migration process.

Also in situations wherein a user activates a service associated with a newly acquired client, portability issues may have to be resolved during the activation. The operator however has no knowledge in advance when a subscriber activates the new client. In some cases a happy call by the subscriber is required to indicate to the operator of the receiving network that the client for accessing the receiving network is ready (configured) for use. It is then up to the operator to efficiently process the happy call and make the necessary arrangements in the receiving network. In migration scenario's, in most cases configuring the client for accessing the receiving network, automatically causes the disablement of the use of services via the donating network. It is clear that a poorly timed service activation or service migration may thus result in service interruptions leading to undesired situations where the user is not reachable and/or cannot transmit outgoing data.

Hence, there is a need in the art for improved methods and systems for service migration and/or activation. In particular, there is a need in the art for methods and systems for allowing efficient service migration to a next generation network, which allows multiple services to be migrated and/or activated while minimizing the chance of undesired service interruptions.

SUMMARY OF THE INVENTION

It is an object of the invention to reduce or eliminate at least one of the drawbacks in the prior art. In one aspect, the invention may relate to a method for activating a service in a receiving network, preferably an IMS-based receiving network, comprising: creating an extended user profile associated with said at least one client in a user profile database, preferably a HSS, said extended user profile comprising migration server routing information; registering said at least one user equipment with a migration application server on the basis of said migration server routing information; executing a migration service hosted on a migration application server for migrating at least one service associated with said user equipment from a donating network to said receiving network or executing an activation service hosted on said migration application server for activating at least one service associated with said user equipment in said receiving network; and, updating said extended user profile by removing said migration server routing information from said extended user profile.

In another aspect the invention may relate to a system for migrating a service from a donating network to a receiving network, preferably an IMS-based receiving network, comprising: a user profile database, preferably a HSS, configured for creating an extended user profile associated with at least one user equipment to be migrated to said receiving network, said extended user profile comprising migration server routing information; a serving network node for registering said at least one user equipment with a migration application server on the basis of said migration server routing information; a migration application server hosting a migration service for migrating said at least one service from said donating network to said receiving network and/or an executing an activation service hosted on said migration application server for activating at least one service associated with said user equipment in said receiving network; and, a user profile manager configured for modifying said extended user profile by removing said migration server routing information from said extended user profile in response to a migration termination message indicating that said migration of said service from a donating network to a receiving network was successful.

In further aspects the invention may relate to a user profile manager for use a system as described above.

The invention may also relate to a computer program product, wherein the computer program product comprises software code portions configured for, when run by a computer, executing the method according to any of the methods described above.

The invention will be further illustrated with reference to the attached drawings, which schematically show embodiments according to the invention. It will be understood that the invention is not in any way restricted to these specific embodiments.

DETAILED DESCRIPTION

This disclosure discusses herein methods and systems for migrating and activating a client in a network, typically an IP Multimedia Subsystem (IMS)-based network. The details related to specific implementation of IMS is for illustrative purposes only, and one skilled in the art would understand that the methods and systems described may be used for other similarly designed IP-based NGN networks.

Figure 1:
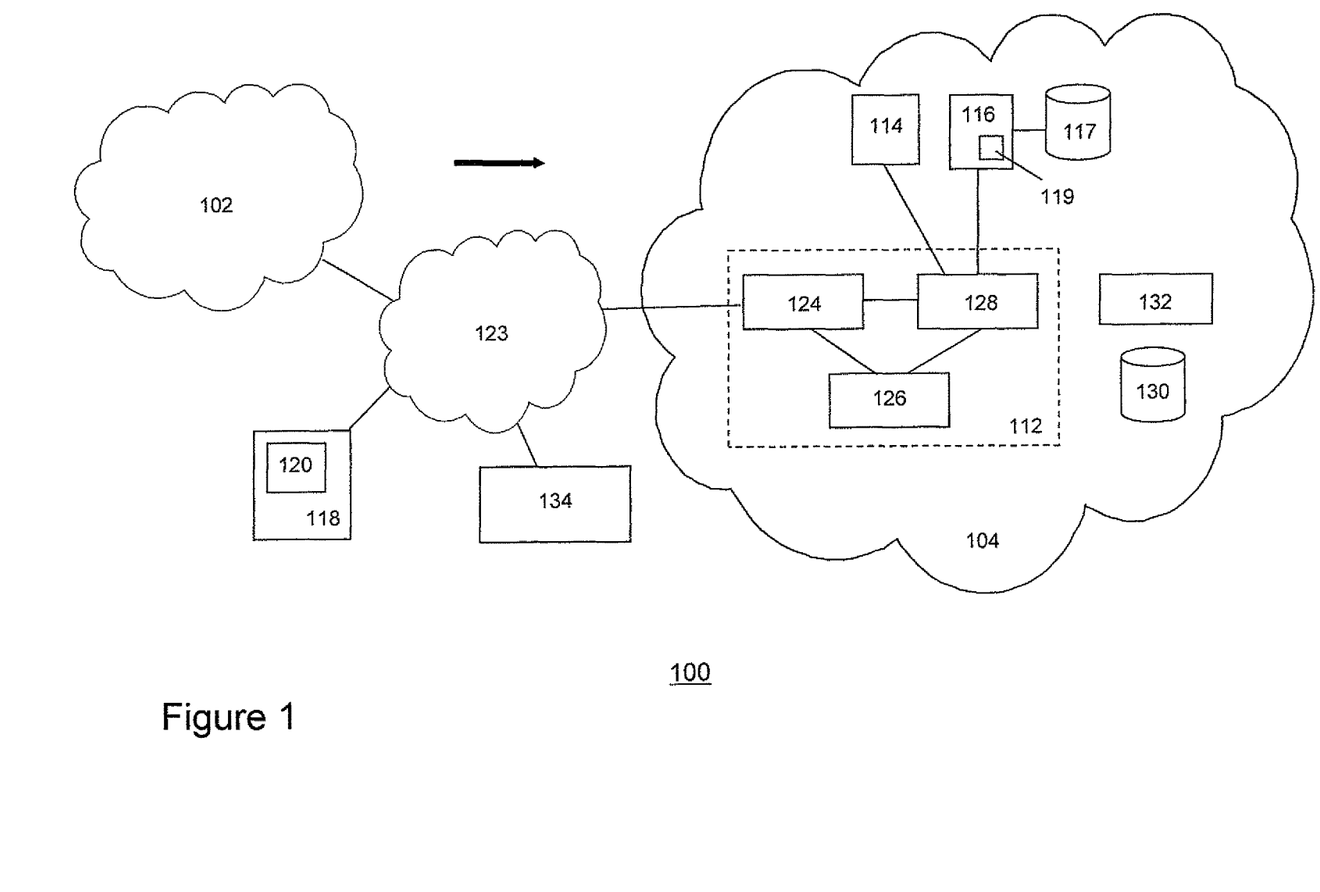
FIG. 1 depicts a schematic of at least part of system for migrating from a first network to a second network according to one embodiment of the invention.

FIG. 1 depicts a schematic of at least part of a service migration system 100 according to one embodiment of the invention. In particular, the migration activation system may be configured for activating a client 120 in a user equipment (n) 118 in a new receiving network 104. Service activation generally refers to the process of creating a user profile in the new receiving network such that the client is able to receive services from the receiving network.

Further, in another embodiment, the migration server may be configured for migrating one or more services (e.g. voice, video and/or multimedia services) in one or more donating networks 102 to a receiving network 104. Service migration generally refers to the process of activating a service, e.g. a VoIP service, associated with a client in the new (receiving) network and deactivating the service in the old (donating) network.

In one embodiment, the receiving and donating network may be part of one operator domain. Alternatively, in another embodiment, the receiving network may be part of a first operator domain and the donating network may be part of a second operator domain.

In exemplary migration situations, the donating network may relate to a conventional TDM network, an IP-based network based on a soft switch (SS) PBX or an IMS-based network supporting voice, video and multimedia services. Typically, the receiving network may relate to an IMS-based next generation network (NGN) which may comprise an IMS core 112 connected to a number of (trusted) IMS application servers. Exemplary application servers may include a VOIP application server supporting voice services, an IPTV application server for supporting multimedia television services, etc.

In order to facilitate seamless migration of one or more services to the receiving network, the migration system comprises a service migration AS 116 connected to the IMS core. The migration AS may use a status database 117 to store status information associated with a migration process. Further, a user profile manager 119 in or associated with the migration server is configured to update a user profile during the migration process. As will be explained hereunder in more detail, the migration AS may be configured to execute a migration service for providing seamless service migration from the donating network to the receiving network.

In a typical migration situation, a user equipment (UE) 118, e.g. a wireline and/or wireless phone comprising a SIP client 120, is configured for receiving services hosted on one or more servers in the donating network. When migrating the UE to a receiving network, the SIP client should be configured to enable services from the receiving network, while services from originating from the donating network should be disabled. In the new situation, the SIP client in the UE is updated to an IMS-based SIP client for connecting to the IMS core.

The IMS core typically comprises Call/Session Control Functions (CSCF), including Proxy-CSCFs (P-CSCF) 124, Interrogating-CSCFs (I-CSCF) 126 and Serving-CSCFs (S-CSCF) 128. A P-CSCF is the first point of contact for the IMS SIP client. If a client is located in a home network, it will connect to the P-CSCF of the home network and if the client is located in an IMS-based visiting network, the client will connect to a P-CSCF of the visiting network.

Using routing information established during the registration of a UE to the IMS core, the P-CSCF routes signaling messages (e.g. SIP INVITE) to the S-CSCF assigned to a UE during registration. The I-CSCF is located at the edge of a domain and identifies the correct S-CSCF for each incoming SIP request and forwards the request to the identified S-CSCF. The IP address of the I-CSCF is published in a DNS system (not shown) of the domain so that remote servers can find it. The S-CSCF performs the session control services, manages the Quality of Services and acts as a SIP registrar.

The IMS network further comprises a Home Subscriber Service (HSS) database 130 (sometimes referred to as the User Profile Server Function (UPSF)) comprising user profiles. A user profile comprises user data including information regarding which services a user is allowed to access. A user profile may further comprise routing information for routing signalling messages that are either originated from or addressed to a particular UE or one or more application servers. The services referenced in the user profile may be identified by a set of initial filter criteria (iFC).

The iFC may be generally regarded as service routing rules comprising a filter part and a decision part, wherein the filter part comprises so-called Trigger Points, defining one or more filter criteria, which are applied to the incoming service message. The decision part specifies the action(s) to be taken when an incoming message matches with the filter criteria of the rule. The iFC thus comprises information for determining whether or not a SIP message should be routed to a service located in a particular application server. The iFCs are defined in the standard in paragraph B.2.2 of document TS 129 228, which is hereby incorporated by reference in this application. The iFCs in a user profile stored in the HSS may be transmitted to the S-CSCF over the Cx interface using e.g. an XML format.

The IMS network may further use an ENUM system 132 for telephone number mapping between telephone number system of the public switched telephone network and the IP addressing and the name space used by the IMS core.

The migration process may be initiated by a migration provisioning system 134. In a first phase, the provisioning system may forward migration information to the client in the UE and the receiving network. In particular, the UE may be provided with a new client, e.g. SIP client, configured for accessing the receiving network. In one embodiment, the UE may download the client from the Internet or may provided over the air to the UE. Alternatively, the UE may execute an update application, a software program, for updating the client so that it is able to access the new receiving network.

Further, the migration provisioning system may send migration information associated with the client to be migrated to the HSS of the IMS-based receiving network.

The migration information may trigger the HSS to create an extended user profile in the HSS associated with an IMS private user identity (IMPI). A set of iFCs in the extended user profile is configured so that during a first registration attempt with the IMS core, the UE is registered with the one or more servers hosting the services the user is subscribed to and the migration application server. The migration information may further comprise one or more migration IMS public user identities (IMPUs), which are used by the IMS system for user addressing IMS services identified in the user profile. A migration IMPU may be included in the extended user profile.

In one embodiment, a migration IMPU may have the form of a SIP URI comprising—in addition to the information fields carried by conventional IMPUs as defined in—information fields carrying information associated with the donating and/or receiving network. A migration IMPU may comprise at least a user identifier (e.g. a phone ID or a messaging ID) and a reference to donating server, e.g. an URI, The donating server reference may allow the migration server to access a donating server for controlling services in the donating server (e.g. disabling one or more services in the donating network).

In further embodiments, the migration IMPU may comprise a donating network reference and/or one or more service references. References to the donating network and services may have the form of a SIP URI and may further facilitate the migration process executed by the migration AS. If multiple users are migrated to the receiving network, the migration information sent to the HSS may initiate the creation of multiple user profiles, each user profile being associated with one or more migration IMPUs, which are provisioned by the provisioning system to the HSS.

The migration IMPU may be comprise activation and/or migration parameters represented by a set of identifiers. In one embodiment the identifiers may be sent in the form of a SIP URI to the migration server. The SIP URI may comprise a string of c separated e.g. an underscore. A migration IMPU may comprise the following string of identifiers, e.g. 31701234567_cvp2_dsrvr1_cvp6_20110125_@ims.imscore.net.

In this example, the IMPU may comprise an identifier 31701234567 for the service in the receiving network, e.g. a telephone number –070 1234567, an identifier for the service type in the donating network (e.g. cvp2=consumer VoIP type 2), an identifier for the donating server (dsrvr1), an identifier for the type of service in the donating network (cvp6=consumer VoIP type 6), a timestamp (20110125=YYYYMMDD year month day) and the domain of the destination network.

The two identifiers identifying the types of services in the donating (cvp6) and receiving (cvp2) network facilitates specific processing steps executed by the migration server.

In case the migration server is used for activating a new user account, the identifier for the donating server may use the identifier "new" and the identifier for the donation service type may use the identifier "none".

In one embodiment, activating a new user account may require the use of a number portability service so that a subscriber may keep his or her telephone number (or other id). The identifier for the donating server in that case may be set to "newnp" indicating the a number portability service should be activated. The service id may be used to for identifying the name of the donating operator.

In yet a further embodiment, a timestamp in the migration IMPU may be used to check whether the customer has performed the first registration attempt within a period in which registration is allow. Further parameters may be added to the IMPU including an identifier of the mobile subscription IMSI for fixed mobile convergence services.

Figure 2:
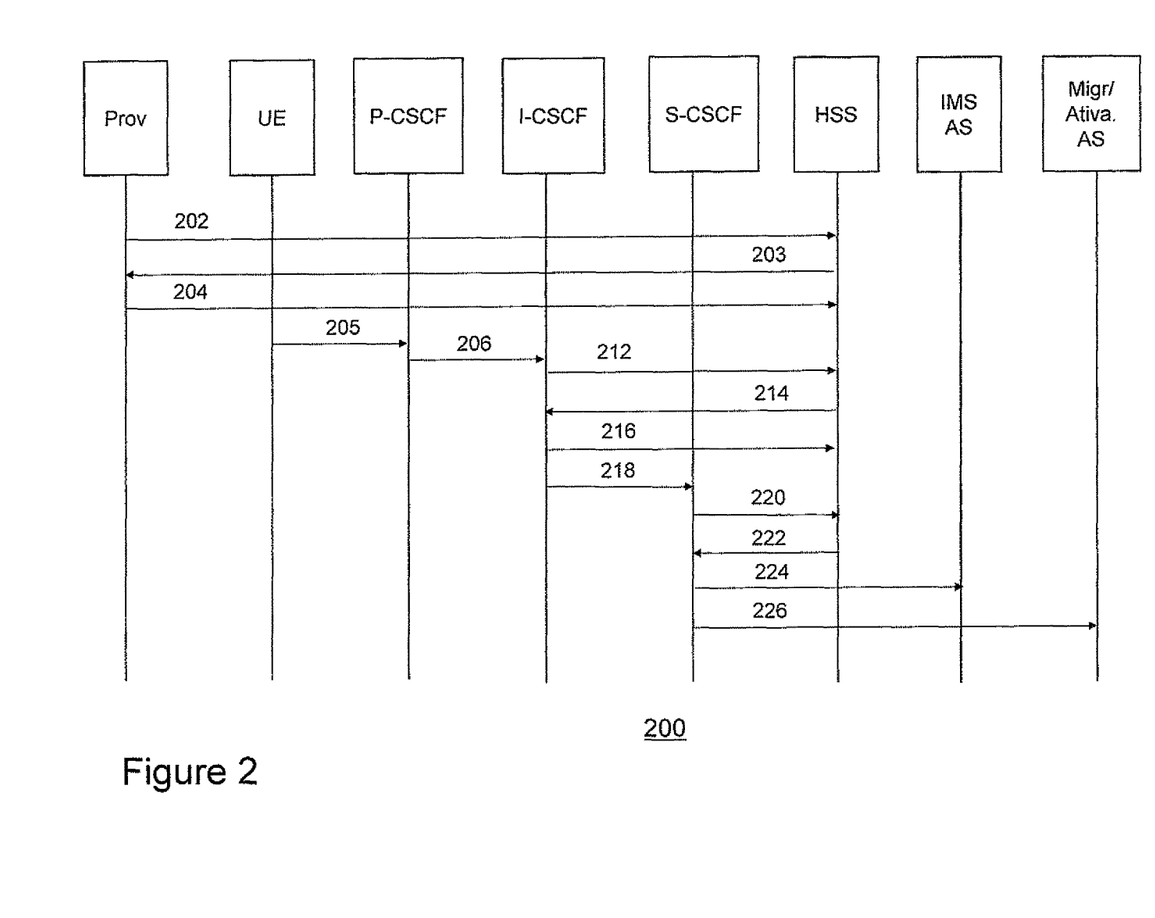
FIG. 2 a registration procedure with an IMS network according to one embodiment of the invention.

FIG. 2 depicts a first part of a migration process 200 according to one embodiment of the invention. In particular, FIG. 2 depicts a first part of a migration process associated with the migration of a user to an IMS-based receiving network wherein a UE provisioned with a new IMS SIP client registers with the migration application server as described with reference to FIG. 1.

The process starts with the provisioning system sending a request for creating an extended user profile associated with an IMPI, to the HSS (step 202). In response, the HSS creates the requested extended user profile and returns an authentication key for authentication to the provisioning system (step 203). The provisioning system then forwards migration information in the form of one or more migration IMPUs to the HSS (step 204). The migration IMPU may comprise at least one reference to the donating network and references to one or more services to be migrated from the donating to the IMS-based receiving network.

This way, the provisioning system provides the receiving network with the information necessary for the migration process, which—as will be described hereunder in more detail—is user-initiated in the sense that once the user turns on the updated UE, the new IMS SIP client will be activated and will try to register with the new IMS-based receiving network.

To that end, the UE will send a registration message, e.g. a SIP REGISTRATION message 205 to the P-CSCF 206 of the IMS core, which forwards the registration message to the I-CSCF 208. Upon receipt of the registration message, the I-CSCF may send a request for capabilities information to the HSS 212 (step 210), which—in response—returns capabilities information back to I-CSCF (step 214). Capabilities information facilitates the I-CSCF to select a suitable CSCF and may include for example the processing load information associated of the available S-CSCFs. On the basis of the capabilities information, the I-CSCF may then select a suitable S-CSCF 216. The selected S-CSCF associated with the UE is subsequently stored with the HSS. The registration message is forwarded to the selected S-CSCF (step 218), which thereafter authenticates the user with the HSS (step 220) in accordance with a known IMS Authentication Key Agreement (IMS-AKA).

After successful authentication and registration, the HSS may load the S-CSCF with the extended user profile (step 222) as described above with reference to FIG. 1. Using the iFCs included in the extended user profile, the S-CSCF subsequently registers the UE with the IMS services as referred to in the one or more migration IMPUs (step 224), including the registration to the migration server (step 226).

When the migration server receives the registration message comprising the migration IMPU, a migration process is triggered, which will be described hereunder in more detail.

It is submitted that FIG. 2 embodies a non-limiting example of the invention and that various modifications of the process flow as described with reference to FIG. 2 are possible, without departing from the invention. For example, in one embodiment, instead of the provisioning system sending the one or more migration IMPUs to the HSS, it may provide the IMS SIP client with migration IMPUs. If the UE is turned on, the IMS SIP client will send a register message comprising the one or more IMPUs to the S-CSCF, which—during the registration procedure—updates the extended user profile with the one or more migration IMPUs.

Figure 3:
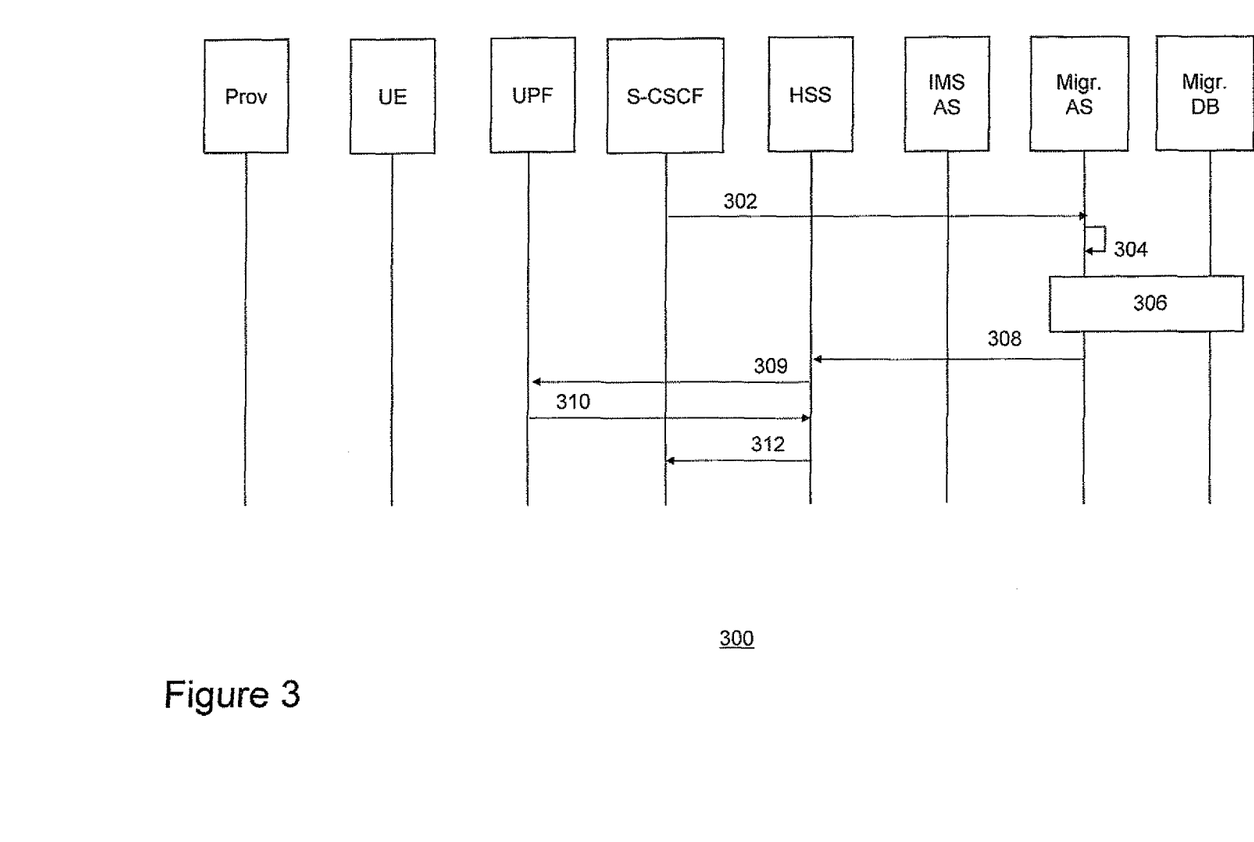
FIG. 3 depicts a flow diagram of a method for migrating a service from a first network to a second network according to one embodiment of the invention.

FIG. 3 depicts a second part of a migration process 300 according to one embodiment of the invention. In particular, FIG. 3 depicts a flow diagram wherein a migration service hosted on the migration application server is executed on the basis of the information in the migration IMPU.

The process may start with the migration AS receiving a registration message comprising migration information, preferably at least one migration IMPU (step 302). In response, the migration AS extracts the donating network information and the references to the one or more services to be migrated from the IMPU (step 304) and starts the execution of the migration service (step 306). During the execution, the status of the migration process is continuously updated and stored in the migration database. If the status information indicates that the migration process is still in progress, further registration messages originating from the UE are ignored. The migration service will disable the services in the donating network and update IMS services with user data originating from the donating network.

Once all migration updates are executed, the migration AS notifies the HSS that the migration process is finished (step 308), which forwards the notification (a migration termination message) to the user profile manager (step 309). If the migration termination message indicates that the migration process is successfully ended, the user profile manager (UPM) associated with the HSS in response updates the user profile by removing (or disabling) the migration service from the extended user profile stored in the HSS (step 310). Then, the HSS sends the thus modified user profile to the CSCF (step 312).

Hence, the migration process as described with reference to FIGS. 2 and 3 provides an efficient auto-provisioning mechanism, wherein in a first phase the HSS is provided with the relevant migration information. Only after completion of this provisioning process, a second phase is initiated. During this second phase, a user activates the new IMS SIP client, which subsequently registers to a migration service for finalizing the migration. Once the migration process is completed, the user profile of the migrated client is updated so that subsequent register procedures will no longer be routed via the migration server. This way, the migration AS is only activated during the first registration attempt of the UE to the IMS network.

Further, subsequent registrations involve the convention registration process to the IMS and the application servers in accordance with the services mentioned in the user profile, which no longer includes the migration service. The migration process as described with reference to FIG. 3 thus allows (almost) seamless migration of services from a first network to a new, second network. Further, the migration scheme allows batch-like migration of groups of users, wherein a second batch is executed only if all users in the first group are successfully migrated.

Modifications of the process flow as described with reference to FIG. 3 are possible without departing from the invention. For example, in one embodiment, the user profile manager may be located with the provisioning system. In such implementation, the migration application server may send the migration notification message back to the provisioning system, which subsequently triggers the user profile manager to update the extended user profile in the HSS in a similar way as described above with reference to FIG. 3.

Figure 4:
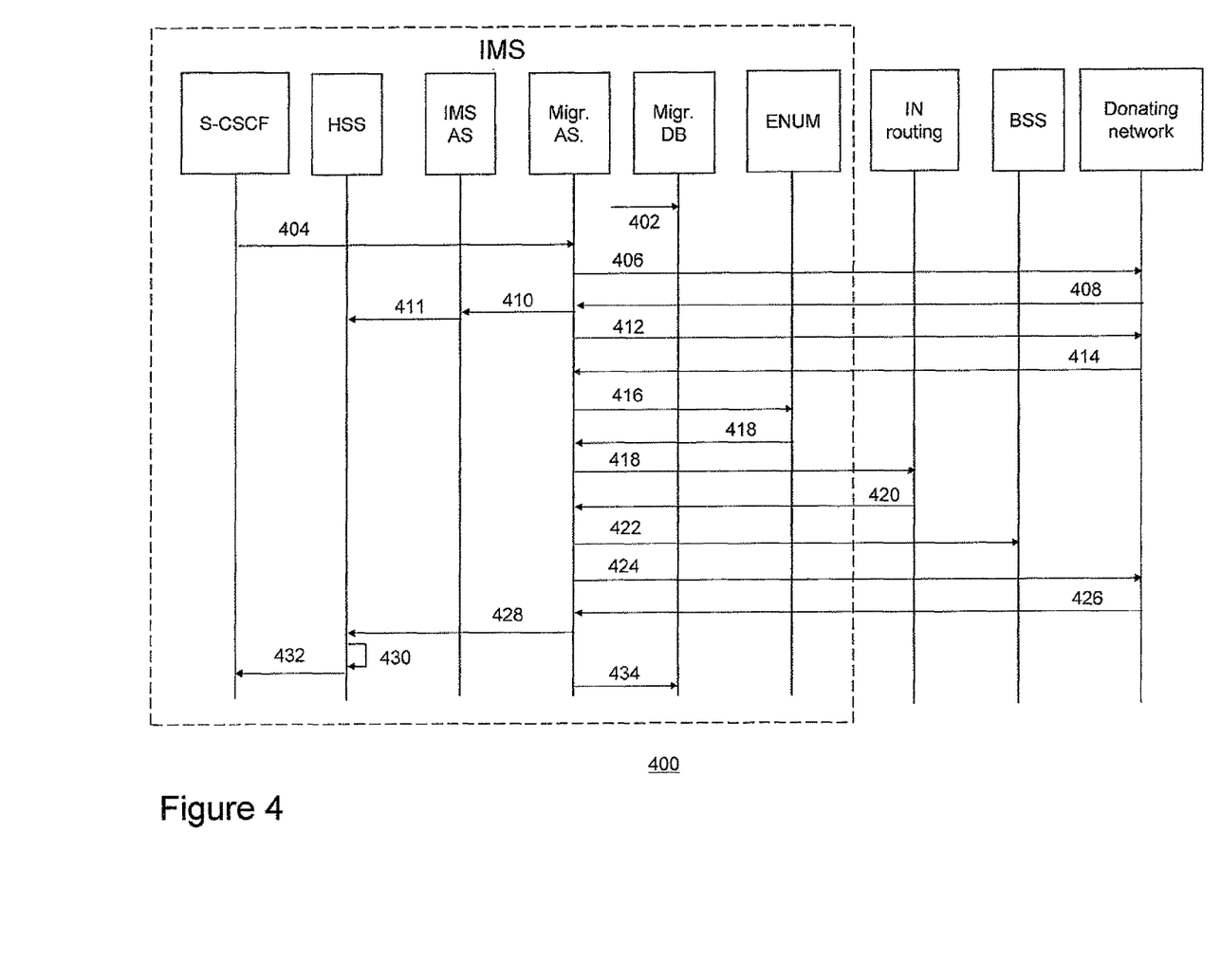
FIG. 4 depicts a flow diagram of part of a method for migrating a service from a first network to a second network according to an embodiment of the invention

FIG. 4 depicts a flow diagram 400 of part of a method for migrating a service from a donating network to a receiving network according to an embodiment of the invention. In particular, it describes the migration processes (step 306 in FIG. 3) executed by the migration service in more detail. In this process the migration AS stores status information associated with the migration process in a migration database during execution of the migration service.

The migration service may be started with the migration AS receiving the registration message comprising the migration IMPU from the S-CSCF (step 402). In response, the status information associated with the migrating UE may be initialized to a starting value (e.g. by setting a status register to a NULL value) (step 403). Then, as a first migration update, the migration service may use a SIP URI of a donating server in the migration IMPU to request and receive user settings from the donating network (steps 406 and 408) and process these user settings.

In one embodiment, in case of dataless AS, the migration AS may update user data in the HSS and/or the one or more application servers (steps 410 and 411). The migration service may further request migration information associated with services to be migrated, e.g. voice mail, call forwarding, etc. from the donating network and disable one or more services in the donating network (steps 412 and 414). A further migration update may include updating the ENUM system (steps 416 and 418) and the intelligent network (IN) server system(s) used by the IMS network in order to localize phone identifiers associated with a call session. Further, the billing server may be started (step 422). Finally user account in the donating network may be closed so that the services associated with the UE are disabled (steps 424 and 426).

After having executed all migration updates, the migration AS orders the user profile manager to remove the migration AS from the extended user profile in the HSS (step 428), so that—in response—the user profile manager may remove (disable) the migration AS routing information from the extended user profile (step 430). The S-CSCF is subsequently provided with the updated user profile (including an updated set of iFCs) in which the routing information associated with the migration server is removed (step 432). The migration AS finalizes the migration process by setting the migration status register of the US to "migrated" (step 434) so that further registration attempts will not restart the migration process.

Hence, the migration method according to the invention uses a registration process in which in a first phase migration a receiving network is provisioned with an extended user profile and migration information. In a second phase, a migration service is started in response to a registration attempt of a new IMS SIP client of a migrating UE. The migration application server handles all migration updates on the basis of the migration information sent in the registration attempt to the migration application server. Finally, after successful migration a user profile manager modifies the extended user profile associated with a non-migrated UE into to a user profile associated with a migrated UE in which the routing information to the migration service is removed.

In a further embodiment, the migration service server as described in detail with reference to FIG. 2-4 may be used for activation of a client to the network. For example, a new subscriber to one or more IMS services would like to activate a client in a newly ordered UE. In that case the UE is already provided with a SIP client configured to connect to the receiving network.

Figure 5:
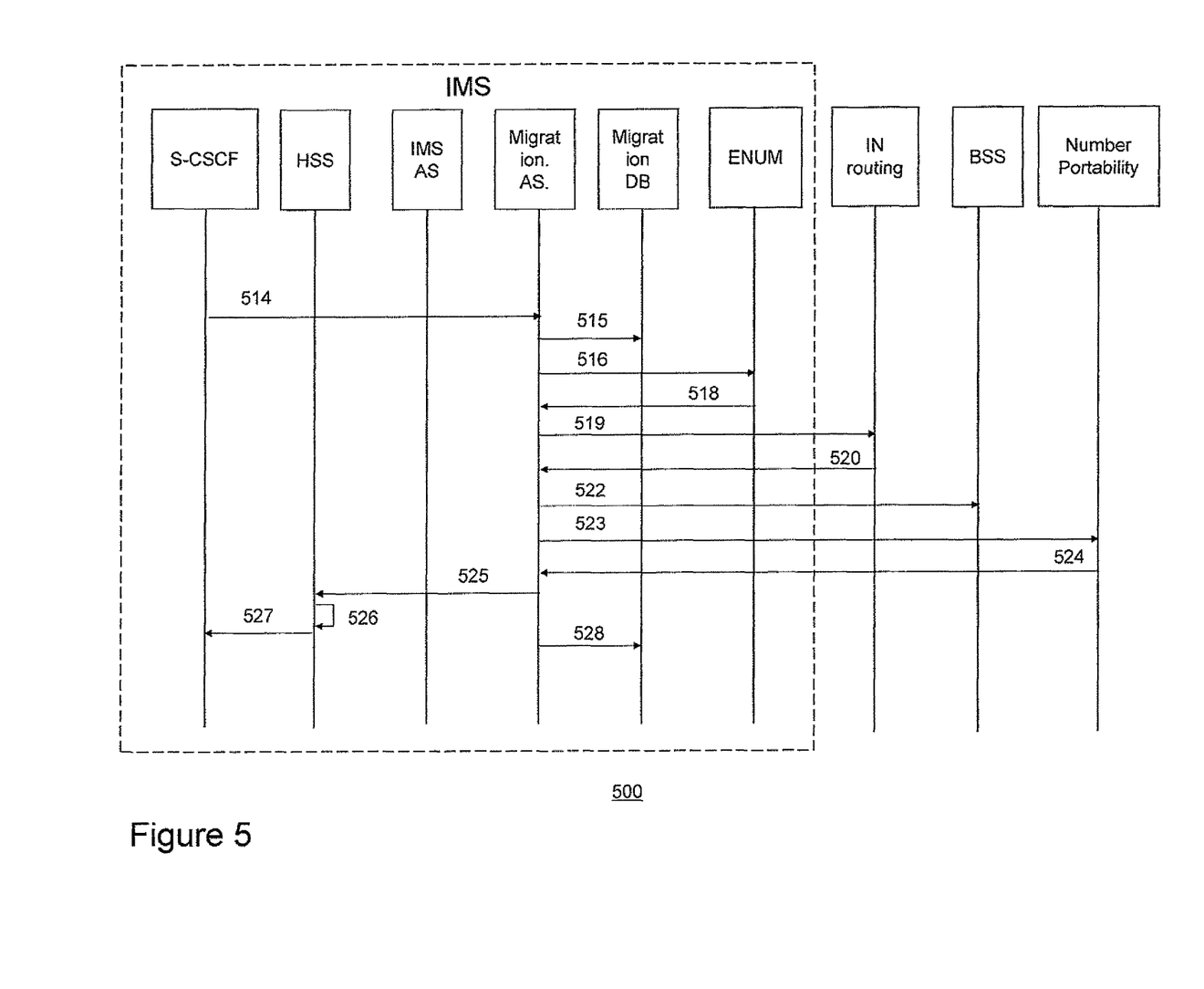
FIG. 5 depicts a flow diagram of part of a method for activating a service in a network according to an embodiment of the invention.

FIG. 5 depicts a flow diagram 500 of at least part of a method for activating a service in a receiving network according to an embodiment of the invention.

The user ordering or purchasing the new UE may trigger the provisioning system sending a request for creating an extended user profile associated with an IMPI, to the HSS. In response, the HSS creates the requested extended user profile and returns an authentication key for authentication to the provisioning system. Then a process may be started similar to that described with reference to FIG. 2 wherein S-CSCF subsequently registers the UE with the IMS services as identified in the activation IMPU (step 516), including the registration to the migration server (step 518).

The activation may be started with the migration AS receiving the registration message comprising an activation IMPU from the S-CSCF (step 514). In response, the status information associated with the migrating UE may be initialized to a starting value (e.g. by setting a status register to a NULL value) (step 515).

The activation may include updating the ENUM system (steps 516 and 518) and the intelligent network (IN) server system(s) used by the IMS network in order to localize phone identifiers associated with a call session (steps 518 and 520). Further, the billing server may be started (step 522).

Further, the activation may include initiating a number portability service in order to ensure number portability (steps 523 and 524).

After having executed all activation steps, the migration AS orders the user profile manager to remove the migration AS from the extended user profile in the HSS (step 525), so that—in response—the user profile manager may remove (disable) the migration AS routing information from the extended user profile (step 526). The S-CSCF is subsequently provided with an updated set of iFCs in which the routing information associated with the migration server is removed (step 527). The migration AS finalizes the migration process by setting the migration status register of the UE to "activated" (step 528) so that further registration attempts will not restart the activation process.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define(s) functions of the embodiments (including the methods described herein) and can be contained on a variety of non-transitory computer-readable storage media. Illustrative non-transitory computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Moreover, the invention is not limited to the embodiments described above, which may be varied within the scope of the accompanying claims.

The invention claimed is:

1. Method for activating a service in a receiving network, comprising:
    creating an extended user profile associated with said-at least one client in a user profile database, preferably a HSS, said extended user profile comprising migration server routing information;
    registering said at least one-user equipment with a migration application server on the basis of said migration server routing information;
    executing a migration service hosted on a migration application server for migrating at least one service associated with said user equipment from a donating network to said receiving network or executing an activation service hosted on said migration application server for activating at least one service associated with said user equipment in said receiving network; and,
    updating said extended user profile by removing said migration server routing information from said extended user profile.

2. Method according to claim 1 further comprising:
    retrieving said extended user profile; and,
    sending a registration message comprising migration information associated with a donating network to a migration server on the basis of said migration service routing information.

3. Method according to claim 1, further comprising:
    said at least one client sending a registration message to said receiving network;
    in response to said registration message, assigning a serving network node to said at least one user equipment;
    the serving network node receiving routing information associated with one or more application servers, the routing information being comprised in said extended user profile; and,
    the serving network node registering said at least one user equipment with said one or more application servers using said routing information in said extended user profile.

4. Method according to claim 1, further comprising:
    receiving migration information comprising donating network information and/or service identifiers for identifying services to be migrated by said migration service.

5. Method according to claim 4, wherein said migration information comprises at least one migration IMPU comprising one or more fields including at least one identifier selected from the group of: a donating network identifier, a receiving network identifier, a service type identifier in the donating or receiving network, a timestamp for establishing a period in which migration should be concluded.

6. Method according to claim 1, further comprising:
    receiving a migration termination message from said migration server that said migration service;
    if said migration termination message indicates that said migration of said service from a donating network to a receiving network is successful, triggering a user profile manager to update said extended user profile.

7. Method according to claim 1, comprising:
    provisioning said at least one user equipment with a SIP client update, said update configuring said client for contacting said IMS-based receiving network; and/or
    provisioning said user profile database with user profile information for creating an extended user profile in said database, said extended user profile being associated with said at least one user equipment to be migrated to said IMS-based receiving network; and/or provisioning said user profile database with migration information.

8. Method according to claim 1, further comprising:
on the basis of said migration information, said migration service retrieving donating user settings from one or more donating servers in said donating network;
processing said donating user setting into receiving user settings associated with said receiving network; and,
provisioning one or more application servers and/or said user profile database in said receiving network with said receiving user settings.

9. Method according to claim 1, further comprising:
on the basis of said migration information disabling one or more services in said donating network.

10. Method for activating a service in a network comprising:
creating an extended user profile associated with said at least one client in a user profile database, said extended user profile comprising activation server routing information;
registering said at least one user equipment with an activation application server on the basis of said activation server routing information;
executing an activation service, hosted on said activation application server for activating at least one service in said network; and,
updating said extended user profile by removing said activating server routing information from said extended user profile.

11. System for migrating a service from a donating network to a receiving network, comprising:
a user profile database, configured for creating an extended user profile associated with at least one user equipment to be migrated to said receiving network, said extended user profile comprising migration server routing information;
a serving network node for registering said at least one user equipment with a migration application server on the basis of said migration server routing information;
a migration application server hosting a migration service for migrating said at least one service from said donating network to said receiving network and/or an executing an activation service hosted on said migration application server for activating at least one service associated with said user equipment in said receiving network; and,
a user profile manager configured for modifying said extended user profile by removing said migration server routing information from said extended user profile in response to a migration termination message indicating that said migration of said service from a donating network to a receiving network was successful.

12. Serving network node for use in a system according to claim 11, said serving node comprising:
means for receiving an extended user profile from said user profile database, said extended user profile comprising migration server routing information and migration information comprising donating network information and/or service identifiers for identifying services to be migrated by said migration service; and,
means for transmitting a registration message comprising said migration information to said migration server using said migration server routing information.

13. A user profile manager for use in a system according to claim 11, said user profile manager comprising:
means for receiving a migration termination message indicating whether said migration of said service is successful or not;
means for modifying said extended user profile in said user profile database by removing said migration server routing information from said extended user profile if said migration termination message indicates that said migration of said service was successful.

14. A migration application server for use in a system according to claim 11 comprising:
means for receiving a registration message comprising migration information originating from a serving network node associated with said at least one user equipment to be migrated to said receiving network;
means for executing a migration service on the basis of said migration information; and,
means for generating a migration termination message indicating whether said migration of said service was successful or not.

15. A non-transitory computer-readable storage medium having instructions embodied therein that, when executed by a computer, cause the computer to perform the method steps according to claim 1.

16. The method of claim 1, wherein the receiving network is an IMS-based receiving network.

17. The method of claim 3, wherein the one or more application servers preferably includes a migration application server.

18. The method of claim 4, wherein the donating network information includes one or more resource locators for locating the donating network or one or more network nodes in the donating network.

19. The method of claim 10,
wherein the network is an IMS-based receiving network,
wherein the user profile database is an HSS, and
wherein the activation service includes the execution of a portability service.

20. The method of claim 11,
wherein the network is an IMS-based receiving network, and
wherein the user profile database is an HSS.

* * * * *